April 30, 1968 U. M. W. BARSKE 3,380,312
FRICTION GEARING

Filed Sept. 22, 1965 7 Sheets-Sheet 1

INVENTOR
ULRICH MAX WILLI BARSKE

By Cushman, Darby & Cushman
ATTORNEYS

April 30, 1968  U. M. W. BARSKE  3,380,312
FRICTION GEARING

Filed Sept. 22, 1965  7 Sheets-Sheet 3

INVENTOR
ULRICH MAX WILLI BARSKE
By Cushman, Darby & Cushman
ATTORNEYS

April 30, 1968  U. M. W. BARSKE  3,380,312
FRICTION GEARING

Filed Sept. 22, 1965  7 Sheets-Sheet 4

INVENTOR
ULRICH MAX WILLI BARSKE

By Cushman, Darby & Cushman
ATTORNEYS

April 30, 1968 U. M. W. BARSKE 3,380,312
FRICTION GEARING
Filed Sept. 22, 1965 7 Sheets-Sheet 5

INVENTOR
ULRICH MAX WILLI BARSKE

By
Cushman, Darby & Cushman
ATTORNEYS

April 30, 1968  U. M. W. BARSKE  3,380,312
FRICTION GEARING
Filed Sept. 22, 1965  7 Sheets-Sheet 7
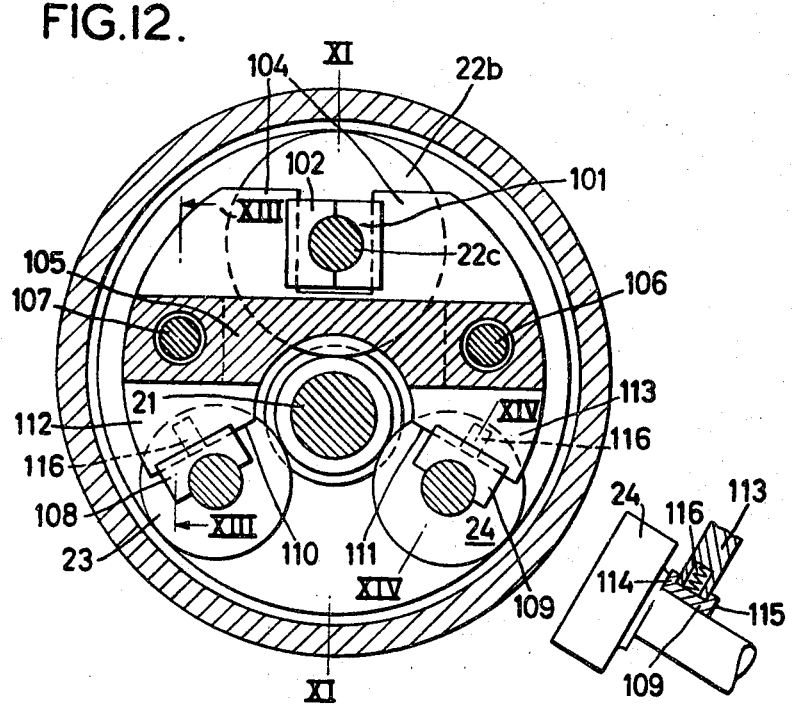
FIG.12.
FIG.14.
FIG.13.
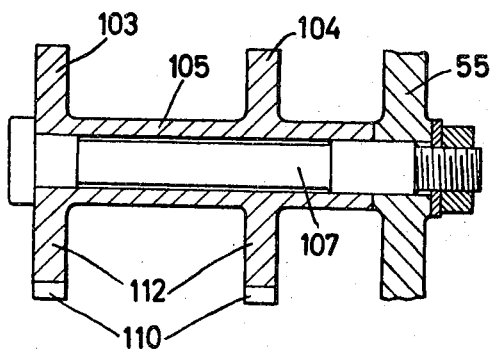
INVENTOR
ULRICH MAX WILLI BARSKE
BY Cushman, Darby & Cushman
ATTORNEYS

United States Patent Office 3,380,312
Patented Apr. 30, 1968

3,380,312
FRICTION GEARING
Ulrich Max Willi Barske, 6901 Altneudorf, near
Heidelberg, an der Klinge, Germany
Filed Sept. 22, 1965, Ser. No. 489,217
Claims priority, application Great Britain, Sept. 24, 1964,
39,030/64
16 Claims. (Cl. 74—206)

ABSTRACT OF THE DISCLOSURE

A friction gear comprising a rotatable ring roller forming an internal cylindrical race and an inner roller located eccentrically within the said ring roller and forming an external race and three intermediate rollers located in angularly spaced relation to each other so that each contacts with the said races for drive, the gear being operable in either direction of rotation with the same system of rollers, and the sum of the degrees of freedom of movement in the plane perpendicular to the roller axes being not more or less than six, two degrees of freedom of movement being permitted to one of the intermediate rollers and the ring and inner rollers having each two degrees of freedom in said plane or one such roller having two degrees of movement in said plane and the remaining two degrees of movement to complete the six being divided one each to the other two intermediate rollers.

---

The invention relates to improvements in friction gears for transmitting power from a driving shaft to a driven shaft by means of cylindrical rollers. As the coefficient of friction obtainable in such gear tends to be rather low the rollers have to be pressed against each other by very high forces but the design problems arising in connection with these high contact pressures have not been solved satisfactorily in the existing types of friction gear.

One way of generating the contact pressures is to apply loadings to the bearings of the rollers by springs or similar means. In that case however, the bearings have to be of a heavy design, they require a considerable amount of lubrication and will nevertheless cause much friction. As the contact pressure has to be adapted to the maximum torque transmitted the high friction losses of the bearings remain unchanged at lower torques so that the efficiency of the gear is considerably reduced under part load conditions.

The high bearings loads are avoided in other designs in which the contact pressures are obtained by an elastic ring, and there is also a certain adjustment of the contact pressure according to the torque transmitted. This adjustment, however, only comes into being if an actual relative slip of the rollers occurs during operation. Another disadvantage is that the elastic ring represents a bulky and expensive item which is subjected to considerable stresses and which does not even take part in the actual transmission of power.

Another friction gear suggested many years ago and also designed with the aim of avoiding high bearing loadings includes an outer (nonelastic) ring providing an internal cylindrical race, an inner cylindrical roller located within and eccentrically to the outer ring, and three intermediate rollers angularly spaced about the axis of the outer ring to operate in peripheral contact with the said race and the said inner roller. The great disadvantage is that every one of the rotating members is provided with a fixed bearing, an arrangement which does not only result in a large number of bearings but also requires extremely accurate machining and assembly, but even this cannot ensure the desired balancing of the contact pressures relative to the bearings because it is physically impossible to obtain statically determined forces. Their magnitudes are dependent more or less on internal elastic deformations of the system which, in turn, are most undesirable as they will prevent a correct line contact to take place between the rollers.

The friction gear according to the present invention makes use of the same geometrical arrangement of the rotating members as hereinbefore described i.e., an outer ring with an internal race, an eccentrically located inner roller and three angularly spaced intermediate rollers contacting both the said race and the inner roller. However, two basic rules underlie the design of this gear, viz:

(1) In a plane perpendicular to the axes of the rotating members (this is the plane of a cross-sectional drawing showing the outer ring and the 4 rollers as circles) the sum of the degrees of freedom of lateral movements of the centres of these members must be equal to 6, and (2) The eccentricity of the inner roller has to be mathematically so determined that the notional lines connecting the centres of the outer ring and the inner roller with the centre of at least one of the intermediate rollers fitted with two of the above named degrees of freedom (clamping roller) form an angle which is smaller than or, at the maximum equal to, twice the "angle of friction" applying to the clamping roller/ring contact point of the system.

Applying the first of these rules ensures the positions of the rolling members relative to each other and relative to the surrounding casing whereby the number of bearings required is minimum, furthermore it allows the running surfaces of the rollers to adjust themselves freely to each other so that correct rolling is ensured and the rollers can be highly loaded without the risk of undue wear. The second rule means that transmission of power takes place without slip, under all operating conditions. The well-known definition of the angle of friction (symbol s) is $$\tan s = \mu = \frac{T}{C}$$

where $\mu$ is the coefficient of friction,
T the tangential driving force acting at any contact point and C the contact pressure needed to prevent slip.

In the friction gear designed according tothe invention these contact pressures are always strictly proportional to the torque transmitted so that a high efficiency is obtained under all operating conditions, and the contacting surfaces are not unduly loaded. The bearings required are few and are, to a small extent only, subjected to forces arising from the high contact pressures.

Another favourable feature of the new gear is that none of the rotating members runs idle but these members take part equally in the transmission of power. The most favourable way of transmitting power is to couple the outer ring with the driving shaft and the inner roller with the driven shaft, or vice versa, the gear thus operating as a speeding up or a speeding down device, respectively. Also of course it is possible for any other of the rollers to be coupled with the driving shaft or with the driven shaft. One at least of the couplings will normally require to permit the relative bodily movements of the appertaining gear components so as not to affect the free adjustment of the rollers.

The gear is of a very simple design and the machining operations involved in its manufacture can be merely turning and grinding which can be carried out with great accuracy by means of standard machine tools; i.e., no highly specialised machinery is needed as it is in the manufacture of toothed wheel gears.

In consequence of the free adjustment of the rollers there is always correct line contact between them, and for the transmission of high torques they can be of any required length. The self-adjustment also makes the assembly very easy and errors are practically impossible.

The invention will be further described with reference to the accompanying diagrammatic drawings, in which:

FIGURE 1 is an illustration of the assembly of the gear in its simplest form while

FIGURES 7 to 14 show actual designs of the gearbox whereby the type illustrated in FIGURE 7 (longitudinal section) is for transmitting lower torques only, FIGURE 8 is a cross section VIII—VIII of FIGURE 7.

FIGURE 9 is a longitudinal section of a gear for higher torques,

FIGURE 10 is an end view of the outer ring, disc portion removed, and of the carrier member.

FIGURE 11 shows another embodiment of the invention in longitudinal section XI—XI of FIGURE 12.

FIGURE 12 is a cross section XII—XII of FIGURE 11, the casing being omitted,

FIGURE 13 is a section XIII—XIII of FIGURE 12 showing the carrier member only,

FIGURE 14 shows a part section XIV—XIV of FIGURE 12.

Figure 1:
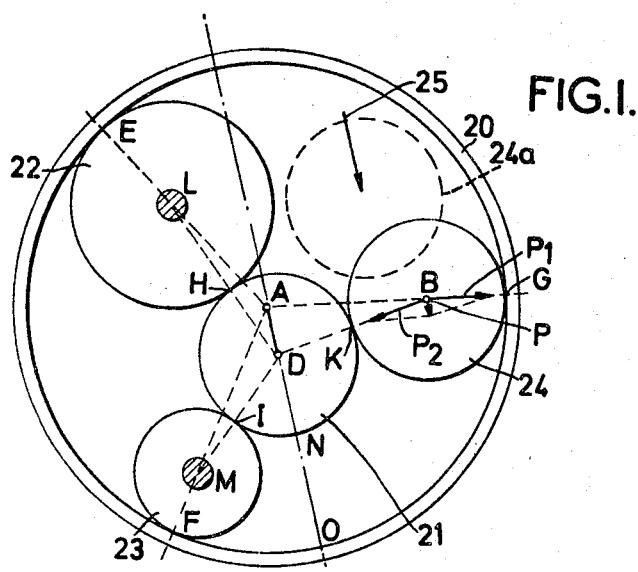

FIGURE 1 shows a diagram of the simplest possible arrangement in which the axes of rotation of two of the intermediate rollers e.g., 22 and 23 are suitably located at L and M in the housing of the gearbox (not shown in this diagram). Then, according to the first theorem quoted above the axes L and M have no possibility of lateral movement i.e. the degree of freedom for both is zero. No bearings are provided, for the outer ring 20, the inner roller 21 and the third intermediate roller 24. Therefore they can move two-dimensionally i.e. they have got two degrees of freedom each which makes a total of $3 \times 2 = 6$, as required. Having first brought the rollers 22 and 23 in position, the outer ring 20 and the inner roller 21 can, due to their two-dimensional freedom, be brought into correct contact with the fixed rollers 22 and 23 so that the contact points E, F and H, I, respectively, and the positions of their centres A and D respectively, are geometrically fixed. Then the line AD represents the eccentricity and the line NO is the minimum distance between the peripheries of the inner roller 21 and the internal race 20.

Taking advantage of its two-dimensional freedom the clamping roller 24 may be moved from a position 24a in the direction 25 i.e., towards the line NO, until it comes in contact at G and K with the outer ring 20 and the inner roller 21, respectively, and it will be seen that also the position of its centre B is then precisely fixed.

When applying now a small force P to the roller 24, as for instance, the weight of the roller, this force can be resolved into the components $P_1$ and $P_2$ acting in the directions BG and BD respectively, and it will be understood that the component $P_1$ pulls the outer ring 20 against the contact points E and F while the component $P_2$ pushes the inner roller 21 against the contact points H and I. Furthermore, it can easily be assessed that the forces acting, as a consequence of P, at the contact points E, H and F, I respectively, are nearly of equal magnitude and are acting approximately in opposite directions, so that the bearings L and M remain practically unloaded.

Figure 2:
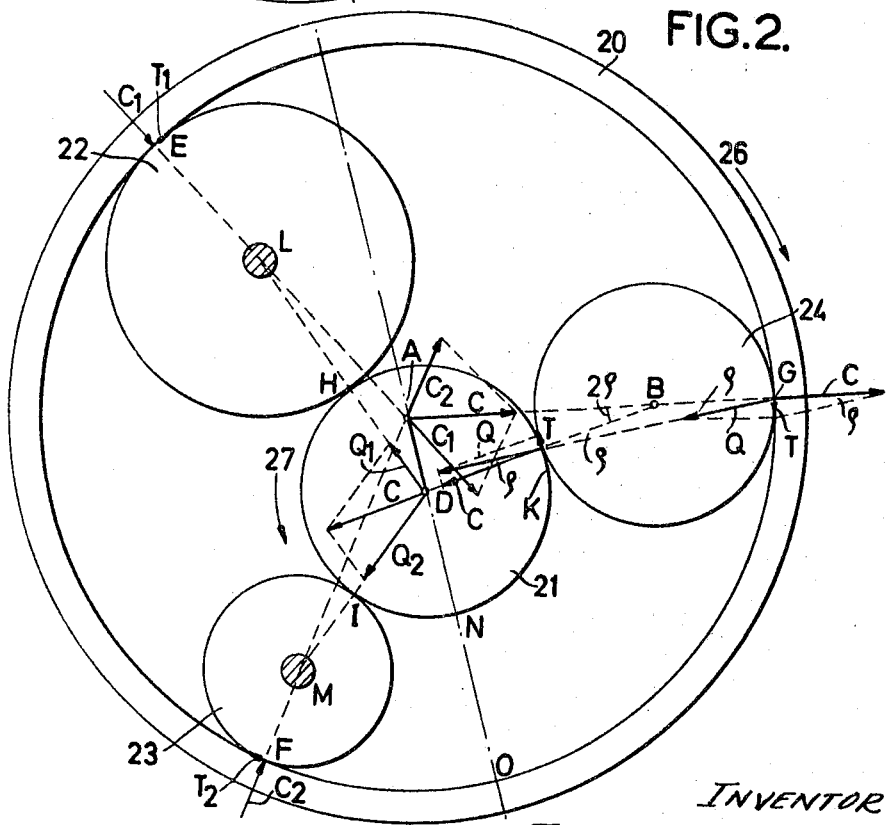
FIGURE 2 shows, in an enlarged scale, the forces acting during operation.

FIGURE 2 shows the whole system in a larger scale so that the forces acting during operation can be clearly indicated. Let the outer ring 20 be connected with the driving shaft (not shown) and rotate in the direction indicated by the arrow 26 then a tangential force T will be acting at the contact point G. The force T is replaced now by its component C (contact pressure) acting in the radial direction AG which is perpendicular to T and its component Q acting in the direction GK, the geometrical conditions being so determined that the ratio $T/C$ is equal to (or smaller than) the static coefficient of friction $\mu$. As $\angle BGK = \angle BKG = s$ (angle of friction) it follows that the angle $ABD = 2s$ This equation is, as already indicated, the second geometrical condition on which the design of this friction gear is based. It makes sure that no slip can occur at the contact point G as the ratio $$\frac{T}{C} = \mu$$

will always remain constant.

Transferring the force C to the point A it is apparent that the components $C_1$ and $C_2$ of the force C, which act in the radial directions AE and AF respectively, form contact pressures at the points E and F respectively. On the other hand, the force Q being transferred to the point K can be resolved into a tangential component and a radial component which, again equal T and C, respectively. The component T indicates that a driving torque is applied to the inner roller 21 which rotates in the direction 27 while the force C when transferred to D furnishes the components $Q_1$ and $Q_2$ which form the contact pressures at H and I, respectively. Tangential driving forces $T_1$ and $T_2$ which will be of a very similar magnitude to T are also developed by the outer ring 20 at the contact points E and F, respectively, and due to the contact pressures obtaining at these points and at H and I power will be transmitted to the inner roller 21 via the fixed rollers 22 and 23. It will also be seen that the contact pressures $C_1$ and $Q_1$ as well as $C_2$ and $Q_2$ balance each other to a considerable extent so that no appreciable loadings will be applied to the bearings L and M.

The description given so far with reference to FIGURE 1 and FIGURE 2 illustrates quite clearly the following advantages of the new friction gear thereby illustrated:

(1) simplicity of design,
(2) easy manufacture of the components,
(3) easy assembly,
(4) automatic and precise adjustment of the rotating members relative to each other,
(5) no appreciable loadings of the bearings caused by the contact pressures,
(6) evenly distributed power transmission through all rotating members,
(7) unchanged ratio of the tangential driving forces to the contact pressures under all operating conditions.

A further very important feature resulting from the geometry of the gear is the fact that the peripheral velocities of the three intermediate rollers are mathematically equal to each other, whatever the diameters of the rollers may be. An even power transmission to the driven member (at H, I, K or E, F, G, respectively) is therefore ensured and furthermore, when machining the rollers, the tolerances to be applied to the diameters need not be extremely narrow but can be kept within usual limits. It will be understood that no contact pressures C would be developed if the driving ring 20 were to rotate opposite to the arrow 26. The clamping roller would remain in its position by its own weight or another suitable force applied in the same direction but the contact pressures would be limited to those ($P_1$ and $P_2$) shown in FIGURE 1, and no appreciable power transmission would be obtainable. Therefore, the theorem can be derived from FIGURE 2 that the periphery of the driving member at its contact point with the clamping roller will always have to move towards the line NO, i.e., the narrowest distance of the space between the inner roller and the outer ring. Correspondingly, if the inner roller 21 would be connected with the driving shaft it would have to rotate opposite to the arrow 27 whereby the outer ring (driven member) would rotate opposite to the arrow 26.

Obviously, the speed ratio obtainable with the illustrated gear is determined by the diameter ratio of the outer ring 20 and the inner roller 21. It also follows from the above that the gear can operate as a step-up and a step-down device. It may be pointed out that any of the intermediate rollers 22, 23 or 24 could also operate as a driving or driven member, if required, the only disadvantage being that the power would be transmitted at two contact points only, instead of three.

Figure 3:
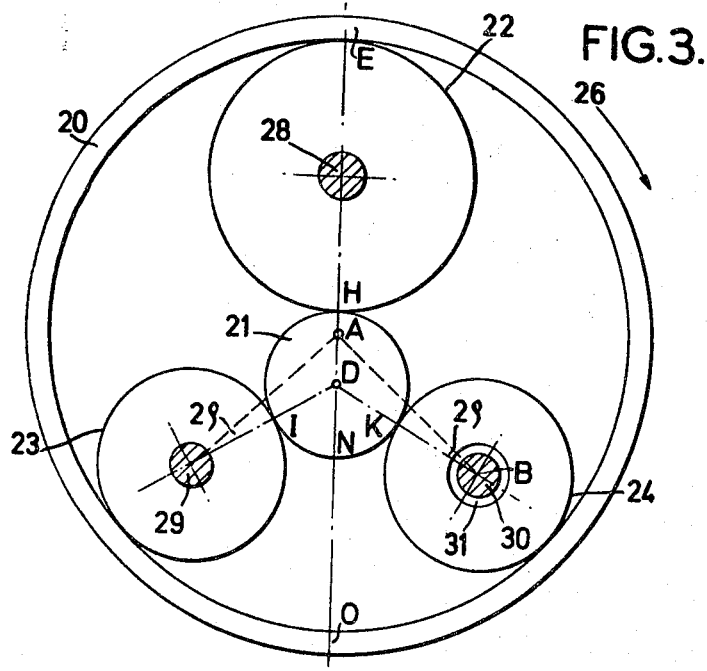
FIGURES 3 and 4 show some more specialised arrangements of the rollers and the bearings.

The arrangement of the intermediate rollers shown in FIGURE 3 is particularly suitable for practical purposes. The axis of rotation of the roller 22 is situated on the elongated line DA which again represents the eccentricity. The other intermediate rollers 23 and 24 have equal diameters and equal angular distances from the line of symmetry EO, the angles IDN and KDN being preferably equal to 60° each. Then the contact points H, I and K are 120° apart from each other. If, as required, the angle ABD is at most equal to $2s$ (roller 24) this also applies to the roller 23.

The rollers 22 and 23 rotate, by way of example, about cylindrical stub shafts 28 and 29, respectively, suitably fixed in a wall of the casing, and a stub shaft 30 of equal diameter is fixed at B. The central bore 31 of the clamping roller 24 is larger than the diameter of the stub shaft 30 so that the roller can freely adjust itself, as required, but this stub shaft will prevent the roller 24 from coming too far out of contact with the other rollers if the whole gearbox should be turned upside down, for instance when being handled.

As in FIGURE 2, the arrangement according to FIGURE 3 can be used for power transmission in the direction 26 (outer ring 20 driving) but as the rollers 23 and 24 are exchangeable with each other it can easily be made suitable for the opposite direction of rotation.

In many practical applications of the invention it will be required to fix the driving member directly to the shaft of the driving machine, say, an electric motor. Then the position of this member is fixed by the bearings of the motor shaft, so that it has no degree of lateral movement. Two of the other rollers have to be made adjustable to the former, exclusively in the radial direction, which means one degree of freedom (linear movement) each. As the clamping roller 24 and the inner roller 21 have two degrees of freedom each the total amount is $2 \times 1 + 2 \times 2 = 6$, as required. This is illustrated, by way of example, in FIGURE 4 which shows the same geometrical arrangement of the rollers as FIGURE 3, the outer ring 20 with a fixed axis A being the driving member rotating in the direction 26. Considering firstly the roller 22 it will be seen that a fixed stub shaft 32 of a rectangular shape is so positioned in the centre of the roller that the longer sides of the cross sectional area are parallel to the radial direction DE. A cylindrical member 33 carrying a ball bearing 34 at its circumference is provided with a parallel slot so that it slidingly fits to the stub shaft 32 whereby clearances 35 and 36 are left at the inner and the outer face of the stub shaft 32, these clearances enabling the roller 22 with the member 33 to adjust themselves so that a contact with the outer ring 20 is ensured at E.

Figure 4:
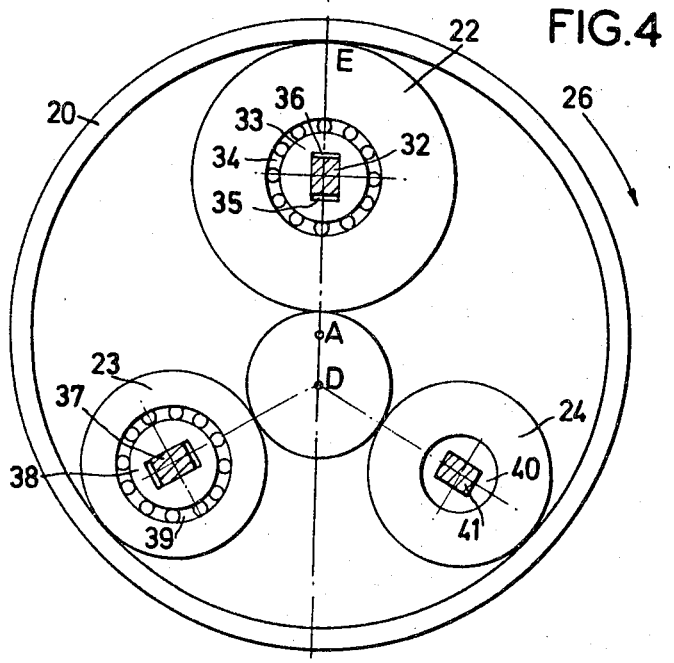

The roller 23 is located in exactly the same way by means of the stub shaft 37 and the member 38 with the ball bearing 39, and in FIGURE 4 the clamping roller 24 is provided with a sufficiently wide bore 40 that it can rotate about the stub shaft 41 without contacting it. As the rectangular slot of the member 38 also fits to the stub shaft 41 the rollers 23 and 24 can be exchanged one with the other thus enabling the friction gear to be operated in the opposite direction. The same arrangement of the radially adjustable bearings 34 and 39 can be used if, instead of the ring 20, the inner roller 21 is fixed to the shaft of a machine so that the axis of rotation D is the fixed one.

It is not necessary for the intermediate rollers to be all of the same material since the coefficients of friction at the three contact positions on the outer race need not be the same. The herein specified condition determining the minimum value of the angle of friction in relation to the eccentricity of the inner roller should however be observed in relation to any intermediate roller which is to serve as a clamping roller.

Figure 5:
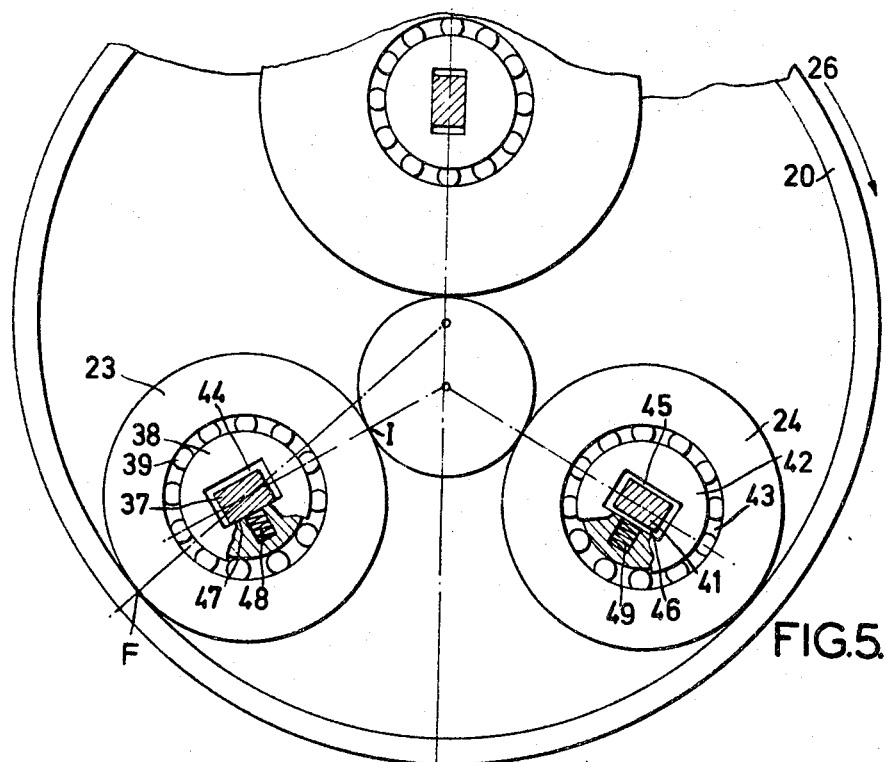
FIGURE 5 and FIGURE 6 are diagrams of two different arrangements of the gear adapted to be operated in both directions of rotation.

The diagram FIGURE 5 is a (somewhat enlarged) version of FIGURE 4 as regards the locations of the intermediate rollers 23, 24 which are both provided now with cylindrical members 38, 42, carrying the ball bearings 39, 43 respectively. The rectangular slots in the members 38 and 42 do not only provide clearances at the short sides of the rectangular stub shafts 37, 41 for radial adjustment of the rollers 23, 24 respectively, but there are also clearances 44 and 45/46 at the longer sides of the stub shafts.

FIGURE 5 shows the positions of the rollers 23, 24 when the outer ring 20 is driving in the direction 26. Then the contact forces acting in the points I and F ($Q_2$ and $C_2$ respectively, FIGURE 2) are pushing the roller 23 and the member 38 against the stub shaft 37 so that there will be no side clearance at 47 but an ineffective side clearance at 44, and the roller has one degree of freedom in the radial direction only. The roller 24 however, has lifted slightly off the rectangular stub shaft 41 so that clearances 45, 46 are produced on both sides. The roller 24 has then two degrees of freedom so that it can act as a clamping roller, as in FIGURE 4.

If the direction of rotation is reversed the clearance 46 will disappear while the clearance 45 increases correspondingly, the degrees of freedom of the roller 24 then being restricted to one while, on the other hand, a small clearance will appear at 47, the clearance 44 being reduced correspondingly, and the roller 23 obtaining two degrees of freedom so as to act as a clamping roller. Thus, the gear will operate automatically in both directions of rotation.

When the gear is stationary the rollers are held in close contact by spring means exerting light forces like P in FIGURE 1, to the rollers 23, 24. By way of example, helical springs 48, 49 are provided in recesses of the members 38, 42 respectively, which are shown partially sectioned.

Figure 6:
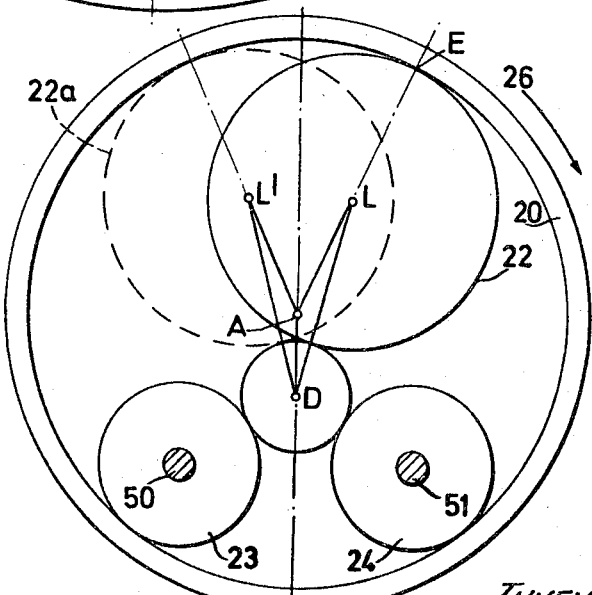

The type of gear with two fixed intermediate rollers as shown in FIGURE 3 can also be made automatically reversible in a similar way but another possibility is shown in the diagram FIGURE 6. In this case the two intermediate rollers 23, 24 of equal diameters have fixed bearings by providing stub shafts 50, 51 respectively, so that neither of them can be used as a clamping roller, this part being played now by the upper roller 22 which has no bearing. Its diameter is such that it can take either the position 22 or 22a. The former corresponds to the drive of the outer ring 20 in the direction 26. When reversing this direction the roller 22 will, by the contact friction obtaining at E, be moved into the position 22a. The "non-slip condition" to be expressed here by $$\sphericalangle ALD = \sphericalangle AL'D \leq 2s$$

can easily be complied with, even for a large eccentricity AD, so that this arrangement is particularly suitable if, for some reason, a large eccentricity is desirable.

Having explained now the technically important arrangements of the rollers and the bearings according to the invention the actual designs shown in the following figures will be understood quite easily.

Figure 7:
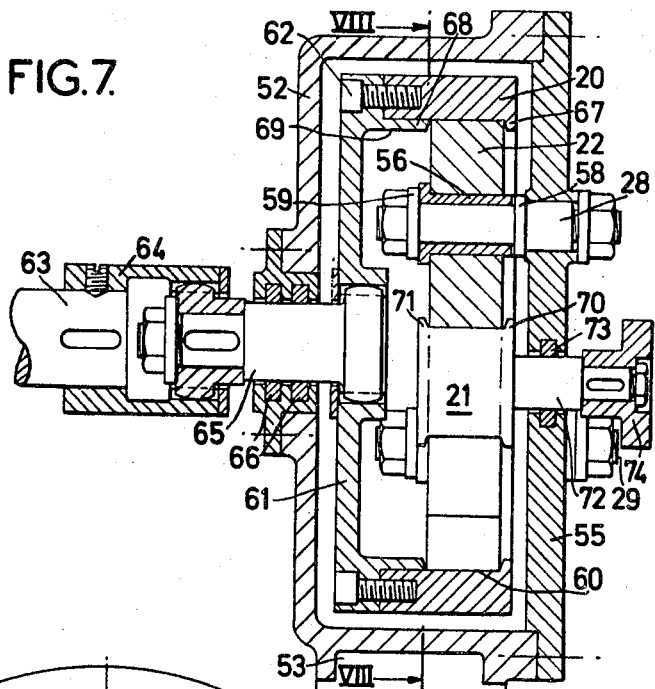
Figure 8:
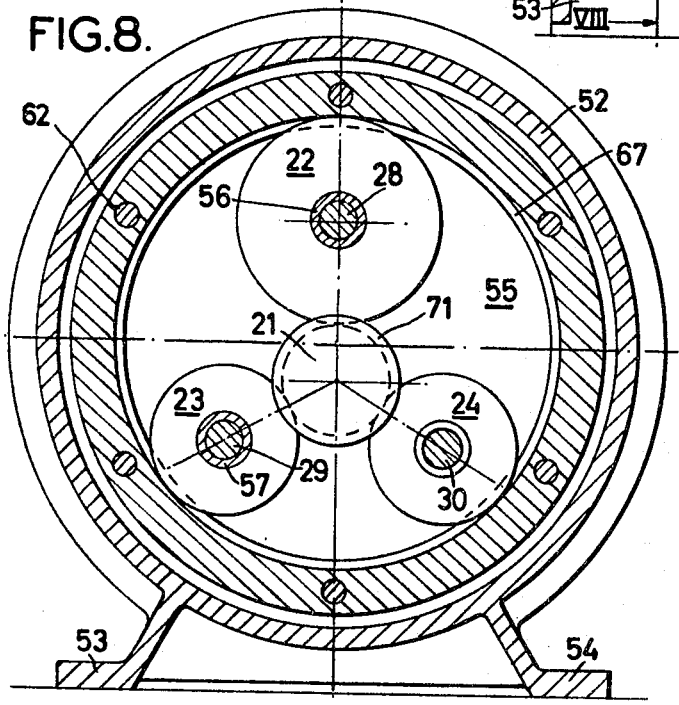

In FIGURE 7 and FIGURE 8 which correspond to the type shown in FIGURE 3 the outer casing 52 of the gearbox is provided with feet 53, 54 to stand on a base plate while the cover 55 carries the stub shafts 28, 29 of the rollers 22, 23 respectively. Bearing sleeves 56, 57 of a suitable material are pressed into the rollers and, as shown in FIGURE 7 the axial position of the rollers is secured by a shoulder 58 of the stub shaft 28 and a washer 59 which are in loose contact with the end faces of the sleeve 56. The clamping roller 24 has no bearing sleeve so that the stub shaft 30 which is identical with 29 does not prevent the roller 24 from adjusting freely, as required. It will be seen that the rollers 23 and 24 can easily be exchanged according to the direction of rotation required.

The outer ring consists of a cylindrical section 20 providing the internal race 60, and a disc-like portion 61 extending inwardly towards the axis of rotation. Both sections could be integral with each other but for ease of manufacture and assembly they are separate parts e.g., held together by screws 62. The disc portion 61 is coupled with the driving (or driven) shaft 63 by means of a flexible coupling which, by way of example, is a toothed coupling of well-known design consisting of the members 64, 65. The intermediate shaft 65 is sealed against the casing 52 by soft rings 66 which protect the inside of the gearbox against dust and loss of lubricant.

The axial position of the ring 20 relative to the fixed rollers 22, 23 is secured by inwardly extending shoulders 67, 68, the latter being formed by the end face of the spigot 69 of the member 61. For the same reason the inner roller 21 is provided with flanges 70, 71. It will be understood from FIGURE 8, that, in turn, the shoulders 67, 68 and the flanges 70, 71 keep the clamping roller 24 in the right axial position relative to the outer ring 20 and the inner roller 21. The latter is, by way of example, integral with a shaft 72 which extends through a bore of the cover 55, a soft seal ring 73 again preventing losses of lubricant and ingress of dust. At its outer end the shaft 72 carries one half 74 of a flexible coupling with which it may be connected to the driven (or driving) shaft.

Figure 9:
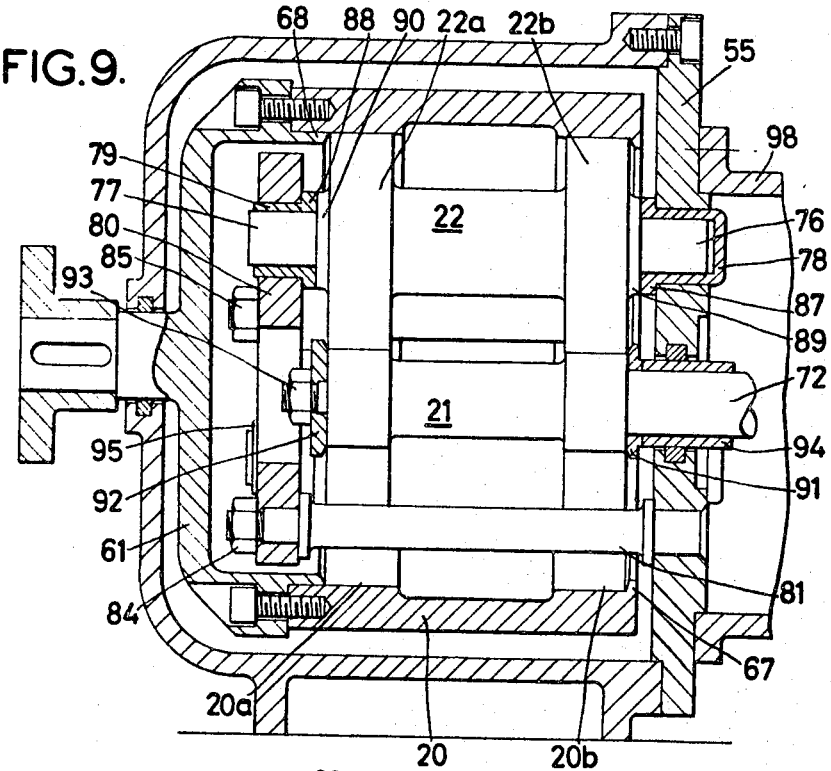
Figure 10:
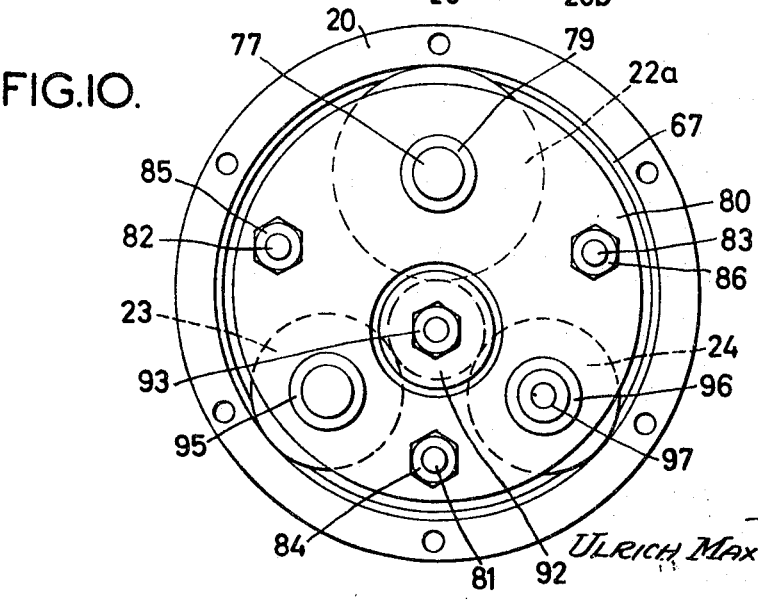
Figure 11:
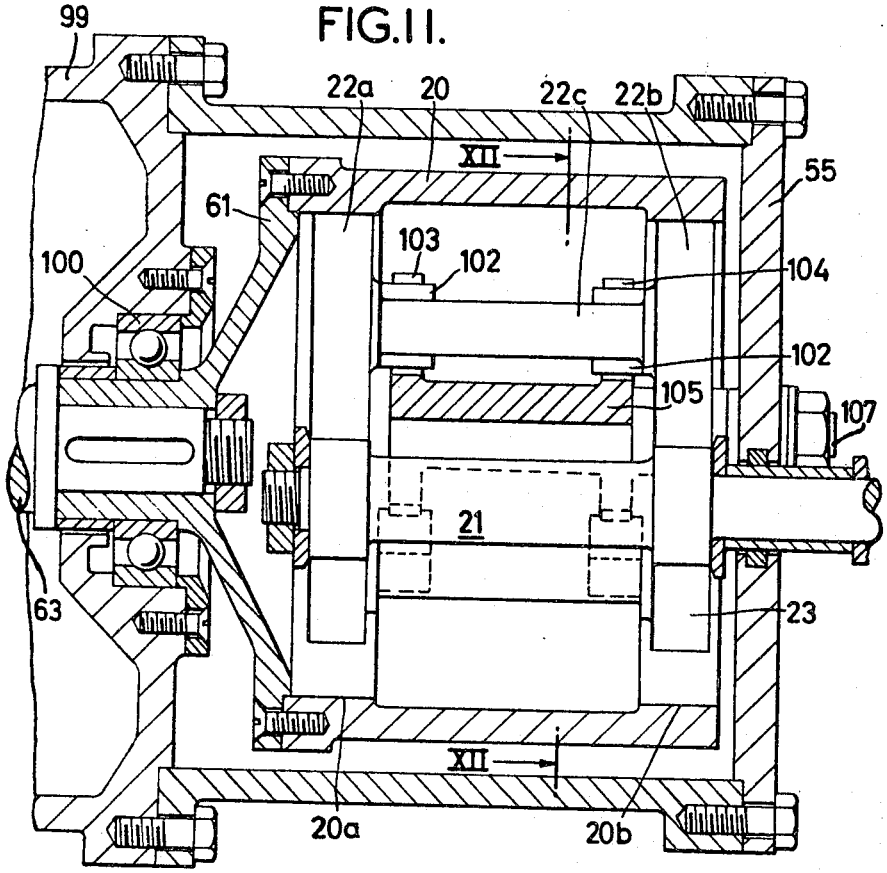

The embodiment shown in FIGURES 9 and 10 is also based on the arrangement of the rollers according to FIGURE 3. However, as compared with FIGURE 7 the axial lengths of the outer ring and the rollers are increased considerably. As will be seen from FIGURE 9 the roller 22 consists of two races 22a, 22b connected by a section of a smaller diameter. The central roller 21 is built up in the same way, and so are the rollers 23, 24 and, correspondingly, the outer ring 20.

Also the bearing arrangement of the fixed rollers 22, 23 is, by way of example, different from FIGURE 7. The roller 22 is provided with trunnions 76, 77 running in bearing sleeves 78, 79 respectively, the sleeve 78 being rigidly located in the cover 55 while the sleeve 79 is fastened in a wall 80 held exactly parallel to and at a suitable distance from the cover 55 by three strong bolts 81, 82, 83 fixed in the cover 55. The "carrier" 80 is, for assembly reasons, detachable when removing the nuts 84, 85, 86. The roller 22 is held in its axial position by flanges 87, 88 of the bearing sleeves 78, 79 respectively, which abut against hub portions 89, 90 respectively, of the roller. The roller 23 is axially located in the same way. Axial movements of the outer ring 20 with its races 20a and 20b, relative to the fixed rollers 22, 23 are again prevented by shoulders 67 and 68, as in FIGURE 7. The flanges of the inner roller 21 are not integral with it but one of them is formed by a ring 91, the other one by a disc 92, the latter being fixed by a nut 93, the former by a distance sleeve 94 which, in turn, is held by some other member mounted on the shaft 72 but not shown on the drawing. The detachable flanges 91, 92 offer the great advantage that the cylindrical races of the inner roller can be ground as easily as those of the intermediate rollers 22, 23, 24 which have no flanges. The same advantage can be obtained for the outer ring 20 when making the shoulder 67 part of a separate spigoted ring which may be fixed to the cylindrical section 20 by a number of screws. For an easy interchangeability of the roller 23 and the clamping roller 24, bearing sleeves 95, 96 (FIGURE 10) and the corresponding sleeves in the cover 55, are provided at both places but the trunnions of the clamping roller 24 (the only one visible at 97, FIGURE 10) have a smaller diameter so that they will adequately clear the inner surfaces of the bearing sleeves.

Obviously, this design permits the transmission of higher torques and another advantage is that the inner roller 21 is more safely located. Therefore, the shaft 72 can be further extended so as to carry at its free end the impeller of a pump, a blower or the like and the casing 98 (partly shown) of the driven machine can be fixed directly to the cover 55 of the gearbox. It will be seen that neither a shaft coupling nor any bearings for the high speed shaft 72 are required. If 72 is the driving shaft driven, e.g., by a high-speed turbine, then the turbine rotor can be fixed to the free end of the shaft, and the turbine casing can be flanged to the cover 55 of the gearbox.

The design presented in FIGURES 11 to 14 corresponds to the arrangement as diagrammatically shown in FIGURE 5. Accordingly the outer ring 20 is fixed to the low-speed shaft 63 via the disc portion 61, the shaft 63 being supported by bearings located in the housing 99 of the machine, as indicated by the bearing 100.

As in FIGURE 9 the outer ring is provided with two races 20a, 20b and so are the rollers but, referring to the roller 22 the disc-like portions 22a, 22b are integral, by way of example, with a shaft section 22c. The bearings are situated between and close to, the portions 22a, 22b whereby those of the roller 22 consist of two halves 101, 102, each. These are slidingly mounted in parallel slots of two upwardly extending walls 103, 104 of the carrier member 105 which is rigidly fixed to the cover 55 by means of two bolts 106, 107. The bearings of the rollers 23, 24 consist of one half 108, 109 respectively, each of which is in sliding contact with the end faces 110, 111 of downwardly projecting walls 112, 113 of the carrier member 105. All the bearing members are located in the axial directions relative to the walls 103, 104, 112, 113 of the carrier 105 by shoulders 114, 115 as clearly illustrated in FIGURE 14. The axial positions of the rollers are fixed in the same way as in FIGURE 9, i.e., the bearing members abut against hub portions of the rollers.

As the axial position of the outer ring 20 is secured to the bearing 100 of the low-speed shaft 63 it follows that no flanges or shoulders are needed for the outer ring. The inner roller 21 is designed in the same way as in FIGURE 9.

It will be understood that, corresponding to FIGURE 5, the roller 22 will always have one degree of freedom in the radial direction while, depending on the direction of rotation, either the roller 23 or the roller 24 may act as a clamping roller, lifting slightly off the guiding surfaces 110 or 111, respectively, thereby obtaining two degrees of freedom, or being pushed towards these faces, respectively, and then having one degree of freedom only. Springs 116 located, by way of example, in the walls 112, 113 and clearly shown in FIGURE 14 will always keep the rollers 23, 24 in close contact with the ring 20 and the roller 21 when the gear is stationary or runs with no load. The rollers need not all be of the same material, e.g., a different material may be used for the intermediate rollers from that used for the ring and the inner roller.

The invention may be embodied in a variable gear. One or each gear stage of such a gear may be constructed in accordance with the invention.

What I claim is:

1. Roller friction gear operable in either direction of rotation without increasing the number of rollers therein comprising a driving shaft and a driven shaft parallel thereto, a rotatable ring roller forming an internal cylindrical race, an inner cylindrical roller located eccentrically within the said ring roller and forming an external race, three intermediate rollers located in angularly spaced relation to each other so that each contacts with the said races for drive, one of said intermediate rollers having two degrees of freedom of movement in a plane perpendicular to the axes of the rollers; the notional lines connecting the centres of the said ring roller and the said inner roller with the centre of said intermediate roller having two degrees of freedom of movement forming an angle which does not exceed double the angle of friction; and means determining that the sum of the degrees of freedom of movement in the said plane of the rollers is not more or less than six.

2. Friction gear according to claim 1, in which one only of said intermediate rollers has two degrees of freedom of movement in said plane; said roller being freely mounted about an axle; said roller during the operation of the drive contacting only the said races and the line from the centre of the inner roller through the axis of the axle of the clamping roller trails the line from the said centre to the point of contact of the clamping roller with the outer ring roller in either direction of rotation.

3. Friction gear according to claim 1, in which said intermediate rollers are arranged symmetrically to the line connecting the centres of the ring and inner rollers, the centre of one said intermediate roller being co-incident with the said line, a guiding axle for that roller permitting guided radial displacement thereof, said other intermediate rollers being of the same diameter as each other, two identically formed axles for said other intermediate rollers, one of said other intermediate rollers having bearing means co-operating with one said axle for guided radial displacement and the other of said intermediate rollers being freely mounted about the other of said axles so as to be displaceable with two degrees of freedom of movement in the said plane; the said other two intermediate rollers being interchangeable so that either one may form the clamping roller with two degrees of movement depending upon the selected direction of rotation of the gear.

4. Frictional gear according to claim 1, in which said intermediate rollers are arranged symmetrically to the line connecting the centres of the ring roller and the inner roller, the centre of one of said intermediate rollers being co-incident with the said line, a guiding axle for that intermediate roller permitting guided radial displacement thereof and thus one degree of freedom of movement in the said plane; the other intermediate rollers being of the same diameter as each other; two identically formed axles of rectangular section therefor; said two other intermediate rollers having rectangular openings with greater length in the radial direction than said axles to permit limited radial displacement, said openings providing play permitting of movement relatively to the axles in a direction at right angles at such radial displacement, said play being taken up during drive by one of the said rollers and not the other; the rotational direction of the gear being reversible when said play is taken up by that one of said intermediate rollers which is the first direction of rotation did not take up the play.

5. A friction gear according to claim 1, comprising means to support said clamping roller to have two degrees of freedom of movement; means supporting each said other intermediate roller to have one degree of freedom of movement in the radial direction the other two degrees of freedom of movement being provided by one of the said race-forming rollers.

6. A friction gear according to claim 1, in which the ring roller is in two parts, one having a spigot engaging in the other, the spigot acting as a stop for the intermediate rollers in one direction and the other part having an inward shoulder acting as a stop for the intermediate rollers in the other direction, and means serving as stops for the internal portions of the intermediate rollers.

7. A friction gear according to claim 1, in which the inner roller and the ring roller are each provided with spaced race portions and said intermediate rollers each comprise two spaced portions engaging said race portions and connected by a shaft portion of smaller diameter and of greater length than the intermediate rollers.

8. A frictional gear according to claim 1, in which the inner roller is supported on a shaft projecting from an end cover, and the intermediate rollers are supported by said cover at one end and at the other end by a cover bolted to the said first cover.

9. Friction gear according to claim 1, in which the axis of rotation of one said intermediate roller is located on a line of symmetry connecting the centers of the ring and inner rollers and the axis of rotation of said intermediate roller and the axis of rotation of another of the intermediate roller are fixed in a housing so that the degrees of freedom in the said plane of these rollers is zero, while the third intermediate roller acting as the clamping roller, the said ring roller and the said inner roller are not supported by bearings so that they each have two degrees of freedom in the said plane in order that they can freely adjust themselves relatively to the two rollers having fixed axes.

10. Friction gear according to claim 1 in which the intermediate roller with two degrees of freedom ("clamping" roller) is arranged about a cylindrical pin of the same dimensions as the pin about which another of the intermediate rollers of the same diameter is arranged so that these two rollers can be exchanged with one another, the clamping roller having a cylindrical bore of sufficient size to permit its free adjustability, to have the two required degrees of freedom, and the other of the said two rollers having a bore substantially corresponding to the size of the pin.

11. Friction gear according to claim 1, in which two of the intermediate rollers are provided at their ends with cylindrical trunnions supported in bearings located, on the one hand, in a disc-like cover of the casing and on the other hand in a wall parallel with and rigidly fixed to the said cover and in which the third intermediate roller ("clamping" roller) has trunnions of smaller diameter arranged to permit this roller to have two degrees of freedom.

12. Friction gear according to claim 11 in which the bearings of the intermediate rollers are arranged between the two races thereof and located in a carrier member rigidly connected to the disc-like cover of the casing.

13. Friction gear according to claim 1 in which the ring roller and the inner roller are provided with flanges co-operating with the intermediate rollers to locate the latter axially relatively to the said ring and inner rollers.

14. Friction gear according to claim 1 in which the axis of the ring roller is fixed, the inner roller and not the ring roller being provided with guiding flanges co-operating with the intermediate rollers.

15. Friction gear according to claim 1 in which one intermediate roller has its axis laying on the line of symmetry of the ring and inner rollers and is adjustable in the radial direction only under guidance of a rectangular axle, while the bearings of the other two intermediate rollers have clearances not only in the radial directions but also in directions at right angles thereto relatively to rectangular axles, these clearances being so dimensioned that in the operation of the gear one of the said other two intermediate rollers which acts as clamping roller, according to the direction of rotation, is clear of the guiding surfaces thus having two degrees of freedom and becoming fully adjustable while the other of said two intermediate rollers is pressed against the guiding surface by the action of the contact pressures and has only one degree of freedom.

16. Friction gearing according to claim 1 in which two of the intermediate rollers of equal diameter have fixed bearings and the third intermediate roller is of larger diameter and acts as a clamping roller in both directions of rotation.

References Cited

UNITED STATES PATENTS

| 1,093,922 | 4/1914 | Dieterich | 74—206 |
| 1,212,462 | 1/1917 | Donnelly | 74—206 |
| 2,970,491 | 2/1961 | Bertsch | 74—206 |
| 3,267,771 | 8/1966 | Bugg | 74—206 |

FRED C. MATTERN, JR., *Primary Examiner.*

C. HUSAR, *Assistant Examiner.*